United States Patent
Guerin

(12) 
(10) Patent No.: US 6,450,385 B1
(45) Date of Patent: Sep. 17, 2002

(54) CLAMPING RING IN PARTICULAR FOR OIL DUCT

(75) Inventor: Jean Guerin, Mont-Saint-Aignan (FR)

(73) Assignee: Coflexip (FR)

( * ) Notice: Subject to any disclaimer, the term of this patent is extended or adjusted under 35 U.S.C. 154(b) by 0 days.

(21) Appl. No.: 09/674,695

(22) PCT Filed: May 5, 1999

(86) PCT No.: PCT/FR99/01062
§ 371 (c)(1),
(2), (4) Date: Nov. 3, 2000

(87) PCT Pub. No.: WO99/58889
PCT Pub. Date: Nov. 18, 1999

(30) Foreign Application Priority Data

May 13, 1998 (FR) ............................................. 98 06031

(51) Int. Cl.[7] ........................... G03B 1/56; B65H 20/24; B65H 59/10
(52) U.S. Cl. .......................... 226/89; 226/112; 226/150; 226/195; 175/423; 188/67; 269/256
(58) Field of Search ............................. 226/39, 89, 112, 226/128, 143, 150, 195; 269/256; 188/67; 175/423

(56) References Cited

U.S. PATENT DOCUMENTS

| | | | | |
|---|---|---|---|---|
| 1,127,066 A | * | 2/1915 | Minkler ....................... 188/67 |
| 2,841,961 A | * | 7/1958 | Lucas ............................. 175/9 |
| 3,540,642 A | | 11/1970 | Riegel ........................... 226/39 |
| 3,579,753 A | * | 5/1971 | Pryor ............................ 188/67 |
| 3,602,413 A | * | 8/1971 | Reynard et al. ............. 226/150 |
| 4,715,456 A | | 12/1987 | Poe, Jr. et al. .............. 175/423 |
| 4,865,359 A | | 9/1989 | Roberts ........................ 285/94 |
| 4,887,673 A | * | 12/1989 | Skoruppa ..................... 175/423 |

FOREIGN PATENT DOCUMENTS

| | | |
|---|---|---|
| FR | 2773603 | 7/1999 |
| GB | 2299646 | 10/1996 |

* cited by examiner

Primary Examiner—Michael R. Mansen
(74) Attorney, Agent, or Firm—Ostrolenk, Faber, Gerb & Soffen, LLP

(57) ABSTRACT

The invention concerns an annular clamping ring in particular for laying oil ducts including a rigid annular base (2) supporting with support apparatus a coaxial ring-shaped assembly of vertical jaws (4) mobile in the diametral planes; said apparatus includes long connecting rods (14) articulated on the base (2) and on the outside of the jaws (4) in an almost vertical position, and the rigid annular body (3) enclosing the jaw (4) assembly, mobile in vertical translation by means of controllable cylinder actuators (6) linking it to the base (2); the jaws (4) are linked with the annular body (3) by at least two connecting rods (5) forming an articulated parallelogram, such that the annular body (3) vertical displacement relative to the base (2) causes a substantially radial and synchronized displacement of the jaw assembly (4).

6 Claims, 12 Drawing Sheets

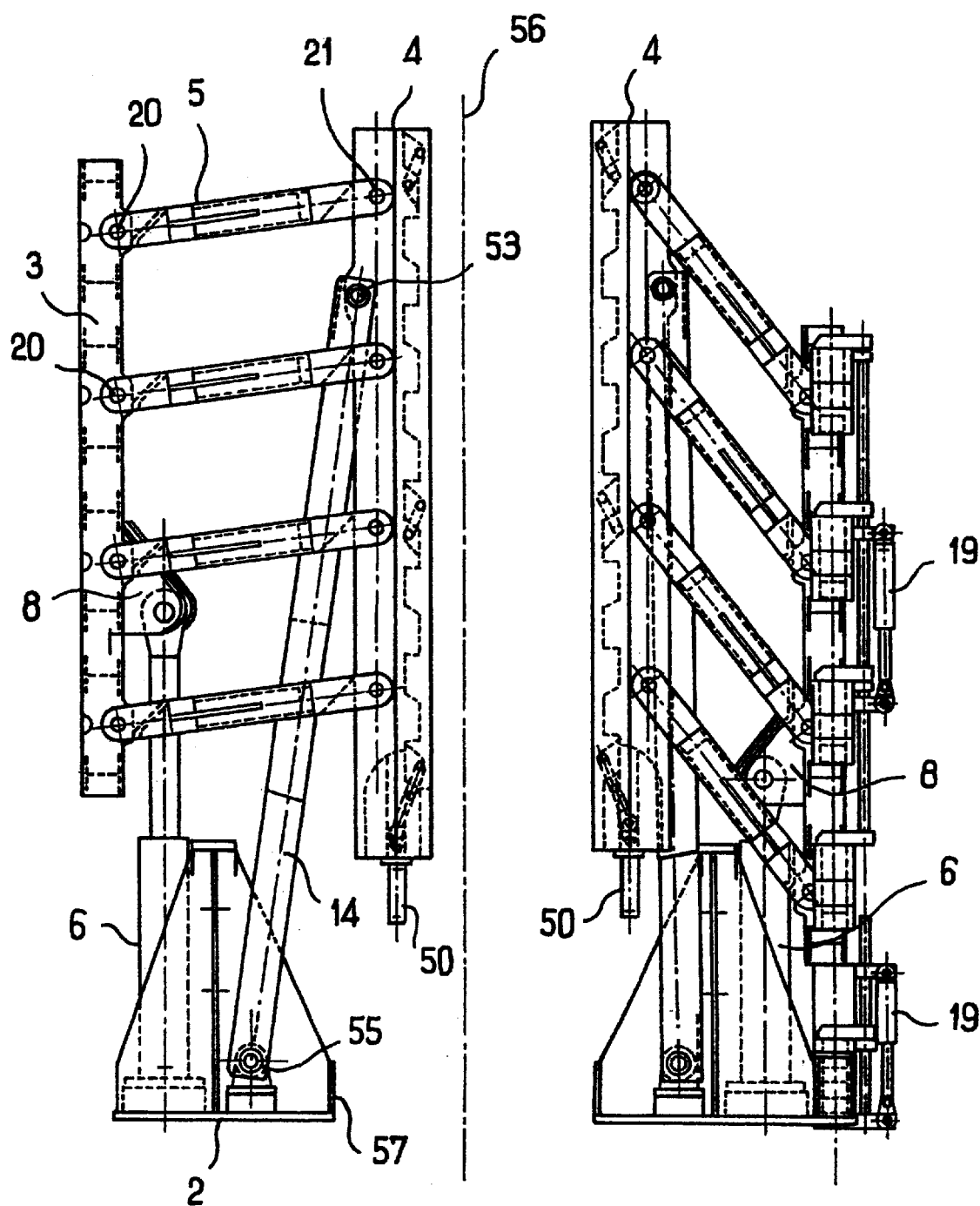
FIG_4

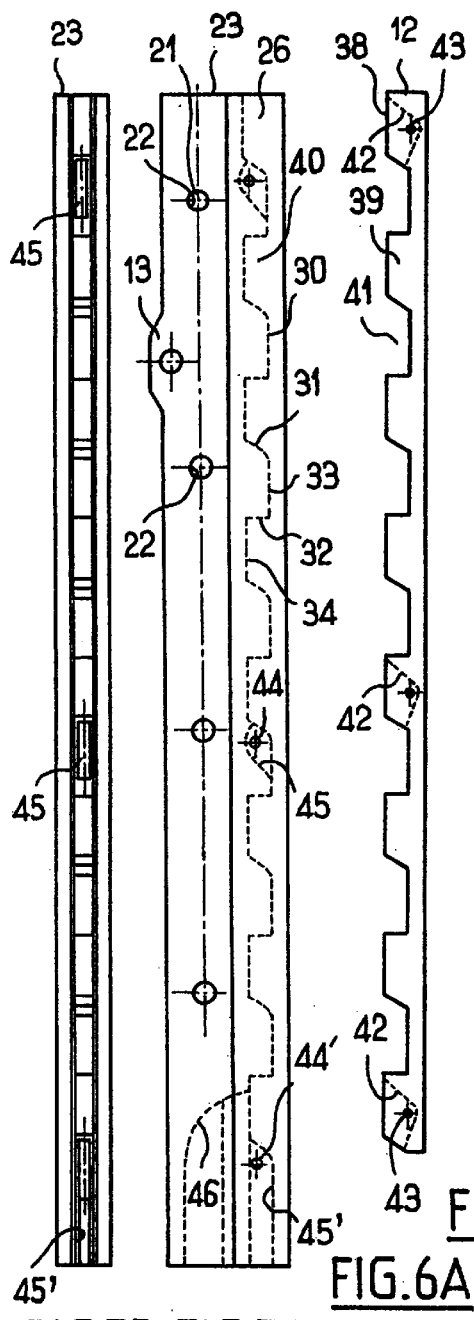
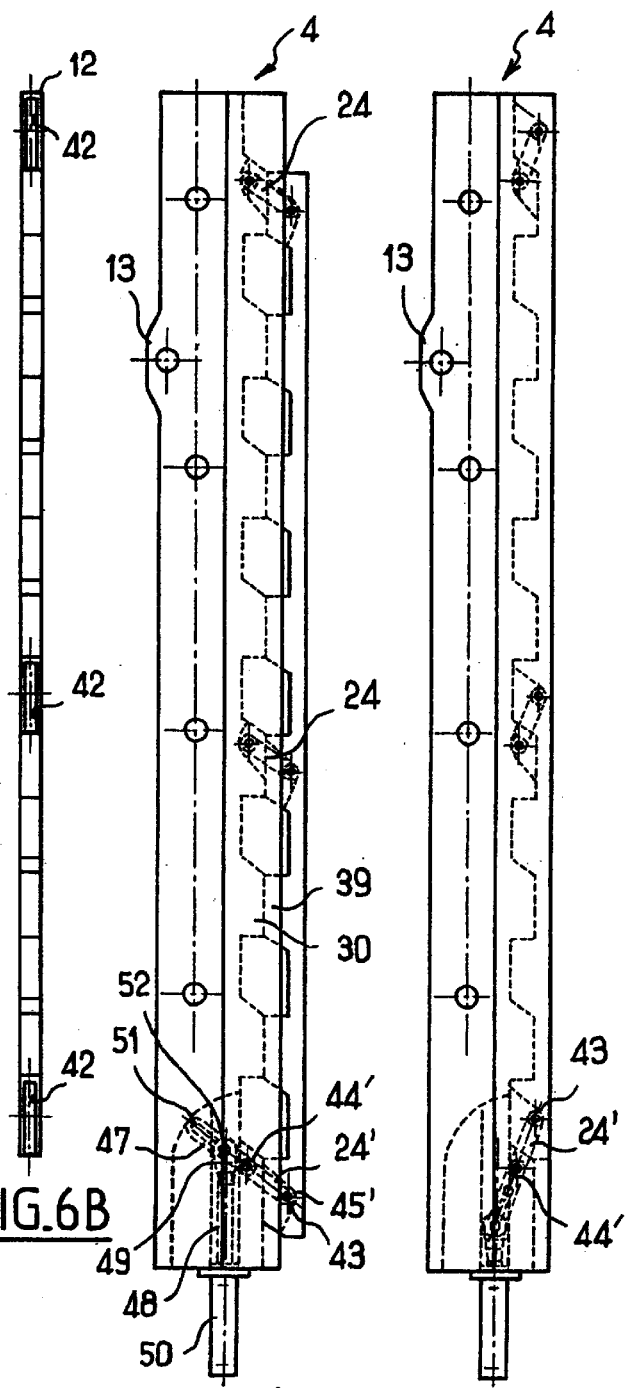
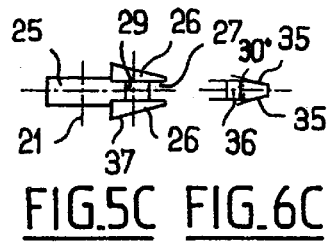

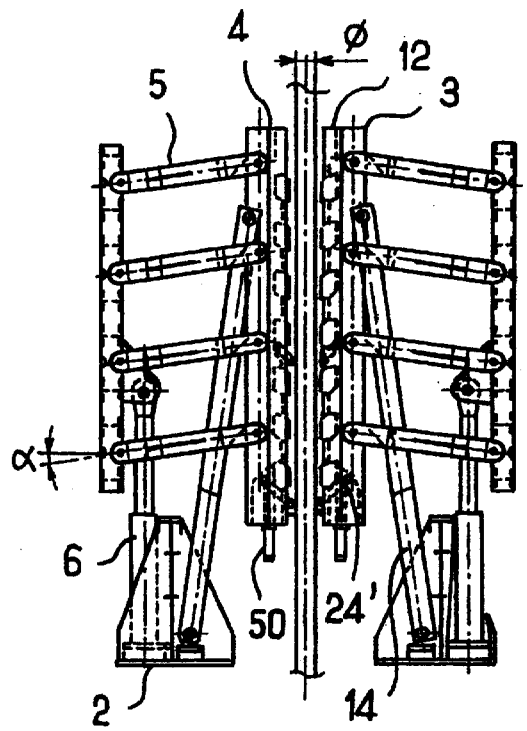
FIG_8A
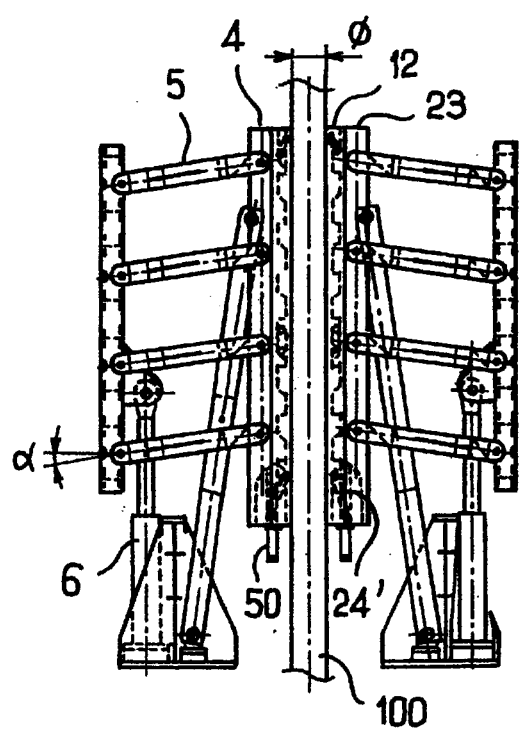
FIG_9A
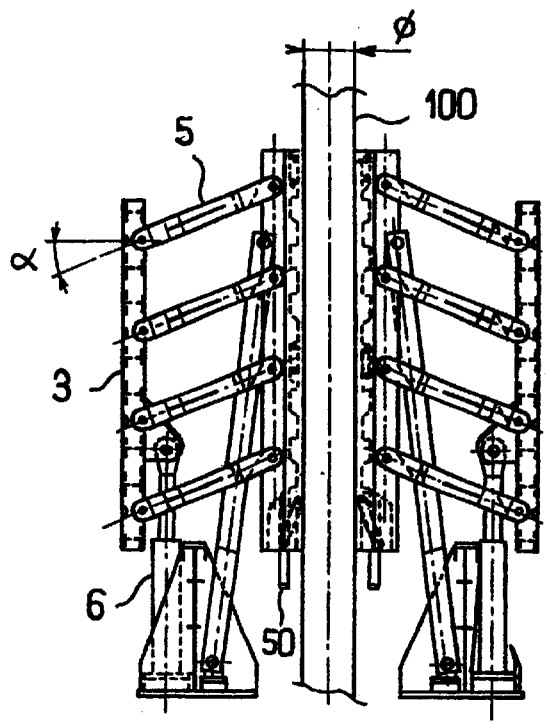
FIG_10A

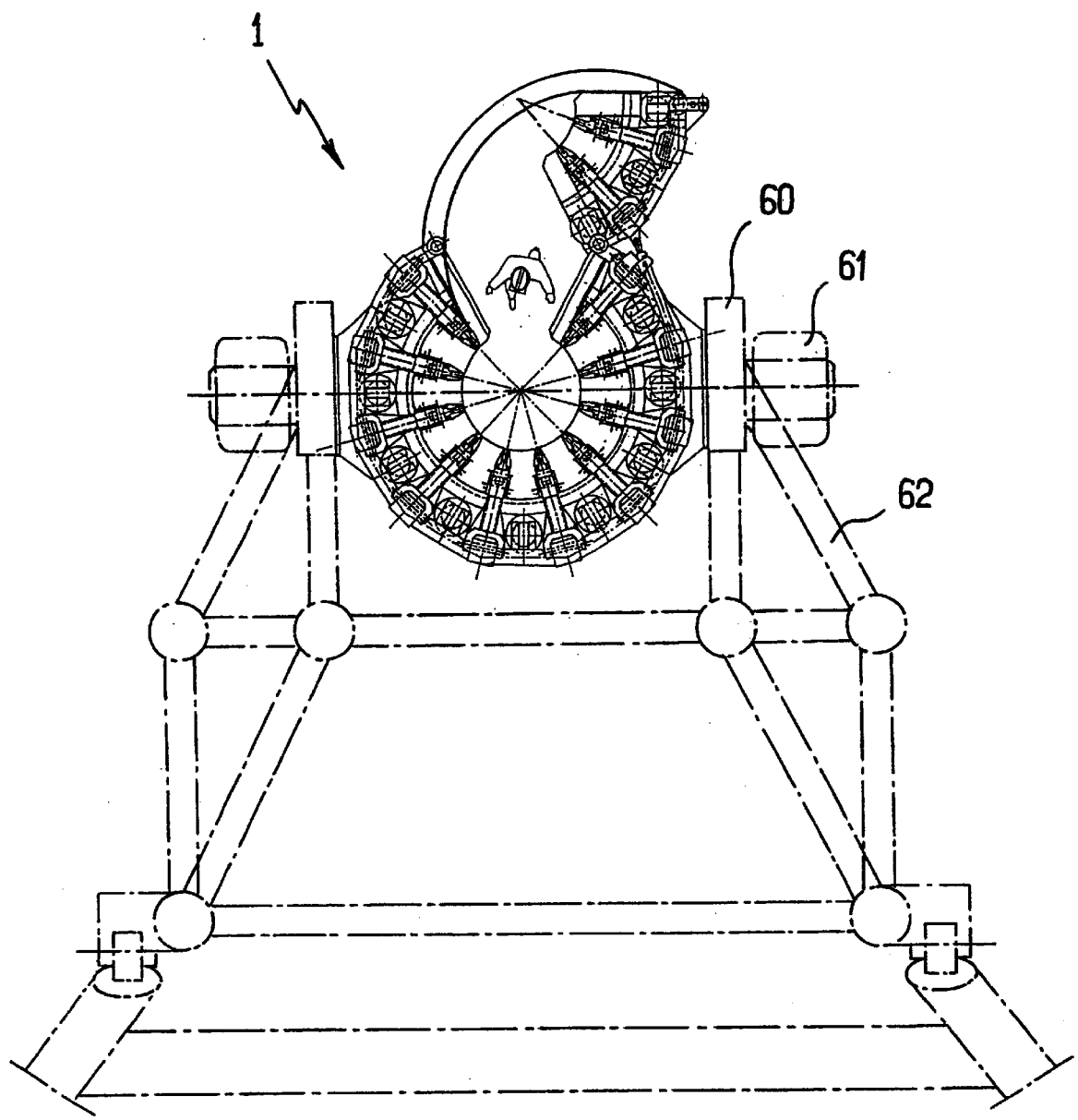
FIG_16

CLAMPING RING IN PARTICULAR FOR OIL DUCT

BACKGROUND OF THE INVENTION

The present invention relates to a clamping ring (otherwise known as a clamp) of large size, particularly intended, by clamping, to hold a rigid or flexible oil duct or a similar heavy cylindrical elongate element (tube, cable, umbilical) and which is designed, in particular, to be used in a device for laying tubular ducts under water from a laying vessel.

French Patent Application No. 98/00148 in the name of the Applicant Company, to which reference can usefully be made, and the teaching of which is incorporated herein by reference, discloses a duct-laying device of the family of J-lay devices. It comprises an inclinable tower, placed in and a great height above the moon pool of the laying vessel, and designed to take a certain length of duct that is to be laid, and means for holding and shifting the said length of duct; the said means comprise two motorized mobile carriages capable of travelling the said height of the tower, and able to take members for holding the duct. These holding members are very advantageously clamping jaws (otherwise known as clamps), that is to say actual (and static) clamping devices, as opposed in particular to linear caterpillar-type tensioners (which entail moving the duct along at the same time as the clamping jaws) By controlling the tightening of the clamps and the displacement of one or other of the carriages along the tower, it is possible to use the device described in the aforementioned application in a great many possible configurations, giving the device great versatility, in order to move the duct along in what is known as the hand over hand fashion.

Document GB 2,299,646 discloses a clamp with jaws borne by connecting rods in the form of an articulated parallelogram, in accordance with the preamble of the appended Claim 1. However, in this device which is intended to keep a duct horizontal, the movement of the jaws is essentially longitudinal and is ill-suited to the problem at which the invention is aimed, namely that of holding heavy vertical ducts.

BRIEF SUMMARY OF THE INVENTION

The object of the invention is to provide a clamp which is particularly well suited to this context.

The object of the invention is achieved by virtue of an annular clamping ring comprising a rigid annular base which has an axis, and supporting, by support means, a coaxial ring-shaped assembly of jaws parallel to the axis and mobile in diametral planes, the said support means comprising, on the one hand, a rigid annular body surrounding the assembly of jaws, mobile in axial translation by means of controllable cylinder actuators which connect it to the base, the jaws being connected to the annular body by at least two connecting rods forming an articulated parallelogram, characterized in that the said support means also comprise long connecting rods articulated on the base and on the outside of the jaws in a position which is almost the axial direction, such that the axial translation of the annular body with respect to the base causes a substantially radial and synchronized displacement of the assembly of jaws.

Advantageously, each of the jaws consists of a main jaw which consists of a main beam and of a secondary jaw which consists of an adapter girder mounted on the main beam at a distance away that can be altered between at least two positions, which makes it possible to increase the range of duct diameters that can be accommodated. As a preference, the adjustment of the distance may differ from one girder to the next or from one group of girders to the next, so that a lower number of girders can be used for ducts of small diameter.

This diversity is further enhanced if the adapter girders are chosen from sets of several sizes.

Advantageously, provision is made in the base and the body of the clamp for a sector, thus constituting a doorway which can advantageously be locked, for slipping a duct in sideways or for inspection.

BRIEF DESCRIPTION OF THE DRAWINGS

The invention will be better understood by virtue of the following description of one particular embodiment, referring to the appended drawings in which:

FIG. 4 is a view in section on IV—IV of the clamp of FIG. 1, the left-hand half section depicting the clamp in the closed position (clamping position), while the right-hand half section depicts it in the open position (released position), FIGS. 5A, 5B and 5C are views respectively from the side, from the front and from above of a jaw vertical main beam, FIGS. 6A, 6B and 6C are views respectively from the side, from the front and from above of a jaw adapter girder, FIGS. 7A and 7C are views respectively from the side and from above of a beam and of a girder of FIGS. 5 and 6, associated in the deployed position, FIGS. 7'A and 7'C are views respectively from the side and from above of a beam and of a girder of FIGS. 5 and 6, associated in the close-together position, FIGS. 8A and 8B are diagrammatic views respectively from the side and from above of a clamp of the invention, with jaws with an adapter girder of a first type, clamping a duct of a first diameter, FIGS. 9A, 9B, 10A and 10B are views similar to FIGS. 8A and 8B for, respectively, ducts of a second, third diameter and the same jaws, FIGS. 11A, 11B, 12A and 12B on the one hand, and 13A and 13B on the other hand, are views similar to the preceding figures for, respectively, ducts of a fourth and fifth diameter with a second type of jaws, and of a sixth diameter with the same second type of jaws, only one in three of which is in the deployed position, FIG. 16 is a diagrammatic view from above of a clamp according to the invention, mounted in a duct-laying tower which is depicted in broken line.

DETAILED DESCRIPTION OF THE INVENTION

Figure 1:
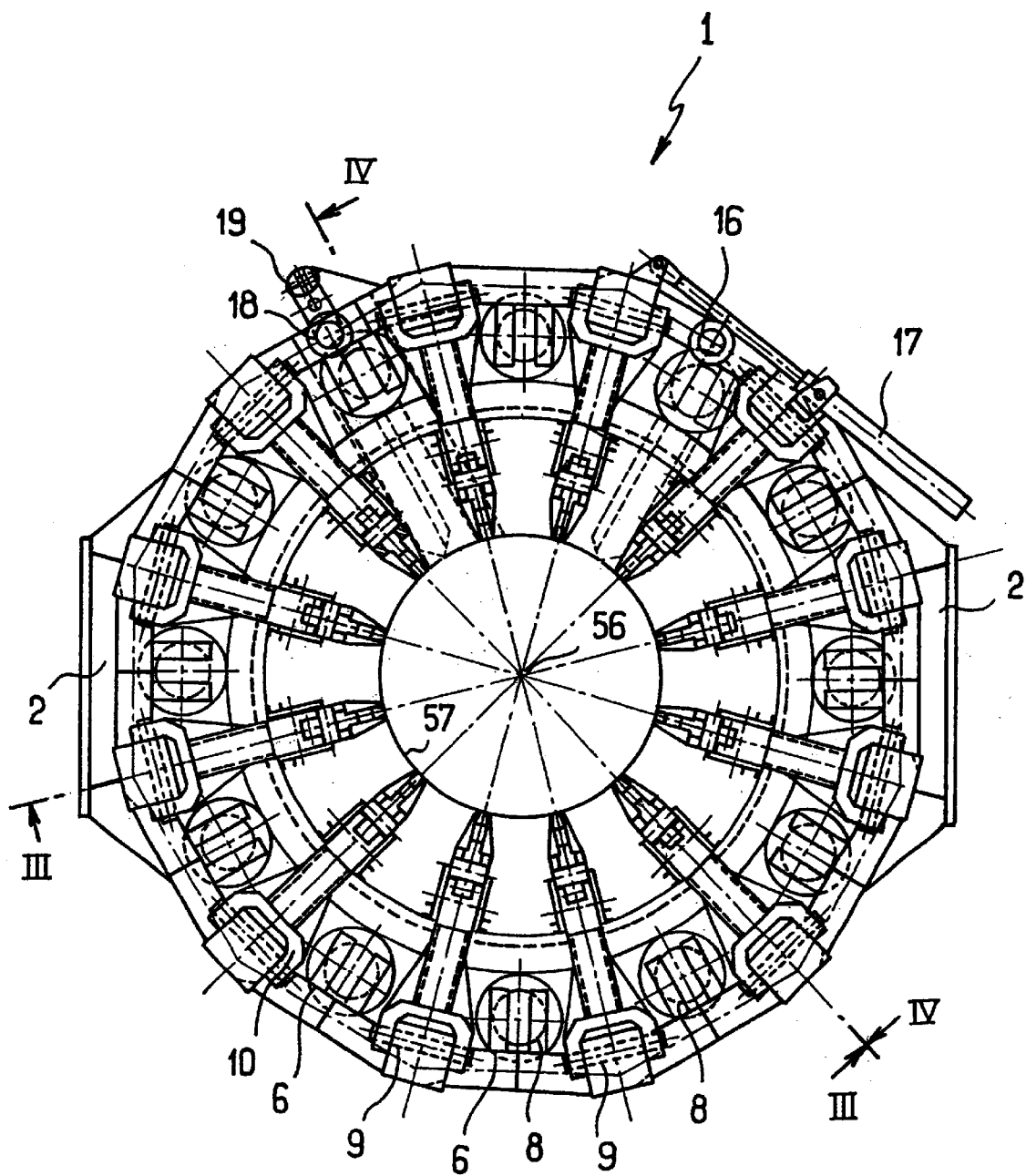
FIG. 1 is a view from above of the clamp of the invention.

Reference is made first of all to FIGS. 1 to 4. The clamp 1 of the invention is essentially made up of a rigid annular base 2, about 5 m in diameter, supporting a clamp body 3 about 4 m high, mobile vertically, on which twelve jaws 4, also about 4 m high, are mounted via four parallel articulated connecting rods 5 about 1.6 m long, keeping the jaws 4 vertical.

The base 2 consists of an annular beam structure leaving, at the centre, an orifice 57 for the passage of a duct of about 1.6 m diameter. Fixed to the annular structure, distributed about the circumference, are the bodies of twelve vertical hydraulic cylinder actuators 6, the top ends of the rod 7 of which are articulated in clevis joints 8 secured to the clamp body 3.

Figure 15:
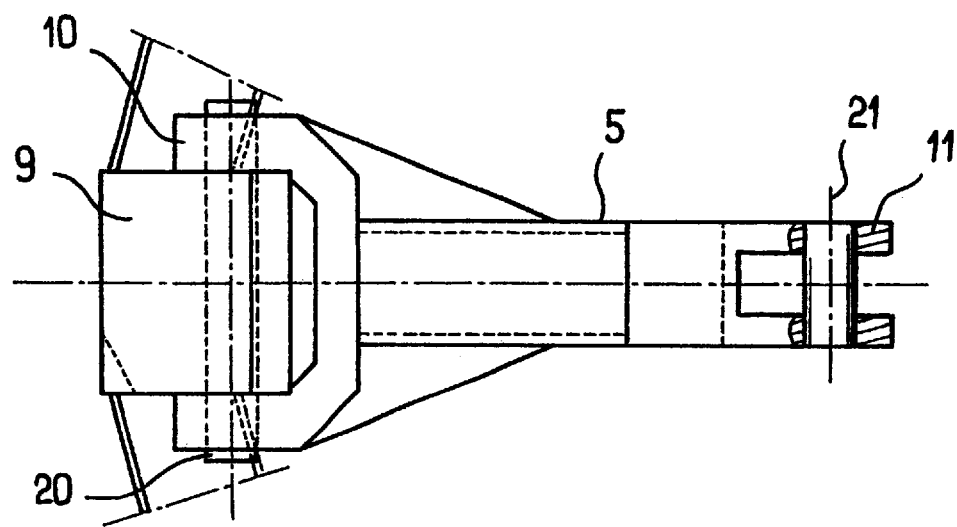
FIG. 15 is a detail view from above of the clevis joint articulating a jaw control connecting rod.

The clamp body 3 consists of a cylindrical (or polygonal for the convenience of producing it in twelve assembled sectors) rigid structure which, on its inner surface, apart from the clevis joints 8 already mentioned, has the articulation supports 9 intended for the clevis joint-shaped bottom ends 10 of the connecting rods 5 connected to the jaws 4. FIG. 15 shows in greater detail the articulation of the clevis joint 10 at the bottom of the connecting rod 5 to an axle 20 passing through the support 9.

The connecting rods 5 are produced in the form of rigid tubes, the top ends 11 of which are also shaped as clevis joints, so that they can be articulated about axles 21 passing through four vertically aligned holes 22 in the jaws 4, as illustrated in FIGS. 5 to 7 to which reference is now made. The jaws 4 consist of vertical beams 23 lined, on the inside, by a mobile adapter girder 12 articulated to the beam 23 by link rods 24 and 24'.

Each beam 23 comprises a section piece 25 of essentially rectangular cross section extended, on its radially interior face (with respect to its position in the circular clamp) by two triangular profiled flanges 26 which leave between them a vertical space 27 of essentially U-shaped cross section, the closed end of which is formed by the radially interior face 29 of the piece 25. This face 29 is crenelated with successive merlons 30 comprising an oblique flank 31 and a straight flank 32, flanking a flat top 33, two merlons 30 being separated by a crenel 40 with a flat bottom 34.

Each adapter girder 12 consists of a section piece of essentially rectangular cross section, the thickness of which essentially corresponds to the width of the space 27 in which it is intended to be inserted, and the length of which may be chosen according to the diameters of the ducts that are to be clamped within a certain range. On the radially interior side of the girder 12, the edges form chamfers 35 inclined at 15° with respect to the vertical mid-plane 36 of the section piece and parallel to the oblique faces 37 of the flanges 26. The radially exterior face of the girder 12 consists of merlons 39 which complement the crenels 40 of the section piece 25. Likewise, the crenels 41 separating the merlons 39 complement the merlons 30.

In the thickness of three merlons 39 of the girder 12, advantageously one at the top, one near the middle and one near the bottom of the girder, there is a recess 42, the vertical walls of which are pierced with an orifice 43 for the passage of an axle allowing one end of the link rods 24 and 24' to be articulated. The other end of the link rods 24 and an intermediate region of the link rod 24' is articulated in the same way to an axle 44 fixed into the walls of recesses 45 formed in corresponding merlons 30 belonging to the beam 23. The width and shape of the recesses 42 and 45 allows the passage and necessary pivoting of the link rods 24 and 24'. The lower recess 44' differs from the top and middle two recesses 45 in that it is extended towards the bottom of the section piece and is also extended radially outwards by a manoeuvring cavity 46 actually inside the section piece 25.

The cavity 46 is intended to house, on the one hand, a continuation 47 of the lower link rod 24' and, on the other hand, the rod 48 and the top end 49 of a cylinder actuator 50, the body of which is arranged under the beam 4. The lower link rod 24' comprises, on the one hand, a part identical in terms of dimensions to the link rods 24 and articulated in the same way on the axles 43 and 44 and, on the other hand, beyond the articulation at 44, the rigid continuation 47 has a longitudinal slot 51 in which the articulation axle 52 for the top end 49 of the cylinder actuator 50 slides.

In the retracted position depicted in FIGS. 7A and 7C, the rod 48 of the cylinder actuator 50 is retracted and has forced the link rod 24' to pivot completely so as to bring the axle 43 into the highest possible position; the collection of link rods 24 and 24' has pivoted at the same time and has placed the girder 12, still vertical, in its highest position in which, because of the way in which the merlons and crenels provided, on the one hand, on the beam 23 and, on the other hand, on the girder 12 fully complement each other, has fully engaged in the space 27, and is therefore fully housed between the flanges 26 of the beam 23. The fitting-together of the merlons and crenels of the beam and of the girder ensures that the vertical forces exerted by one element on the other are fully reacted. The oblique flank 31 and the corresponding oblique flank on the complementary element, allow the link rods to pivot and the fitted-together parts to disengage. In addition, the horizontal components of forces resulting from the weight of a duct (sketched in as 100) applied to the girder and tending to part the two elements because of the obliqueness of the contacting flanks are countered, on the one hand, by the friction of the two flanks one on the other and the position-maintaining force of the cylinder actuator 50 and, on the other hand, by the physical impossibility of parting the two elements from one another, the beam 23 being blocked radially on the outside by the rest of the structure of the clamp and the girder 12 being blocked radially on the inside by the duct 100 against which it actually rests. The resulting end effect is an improvement in the clamping force.

In the deployed position depicted in FIGS. 7'A and 7'C, the rod 48 of the cylinder actuator 50 is deployed, and has caused the link rod 24' to pivot so that the axle 23, at the end of its circular path, reaches it lowermost point In this position, the girder 12 rests via its merlons 39 on the merlons 30 of the beam 23, and protrudes from the flanges 26 as shown in FIG. 7'C. The weight of a duct (sketched in as 100) in contact with the girders 12 tends to press the girder all the more firmly against the beam, because the axles 43 of the link rods 24 and 24' are located below the axles 44. Deploying or retracting the adapter girders makes it possible to create a 9 cm difference with respect to the axis of the clamp (namely an 18 cm difference in diameter for a duct held in the clamp).

Figure 3:
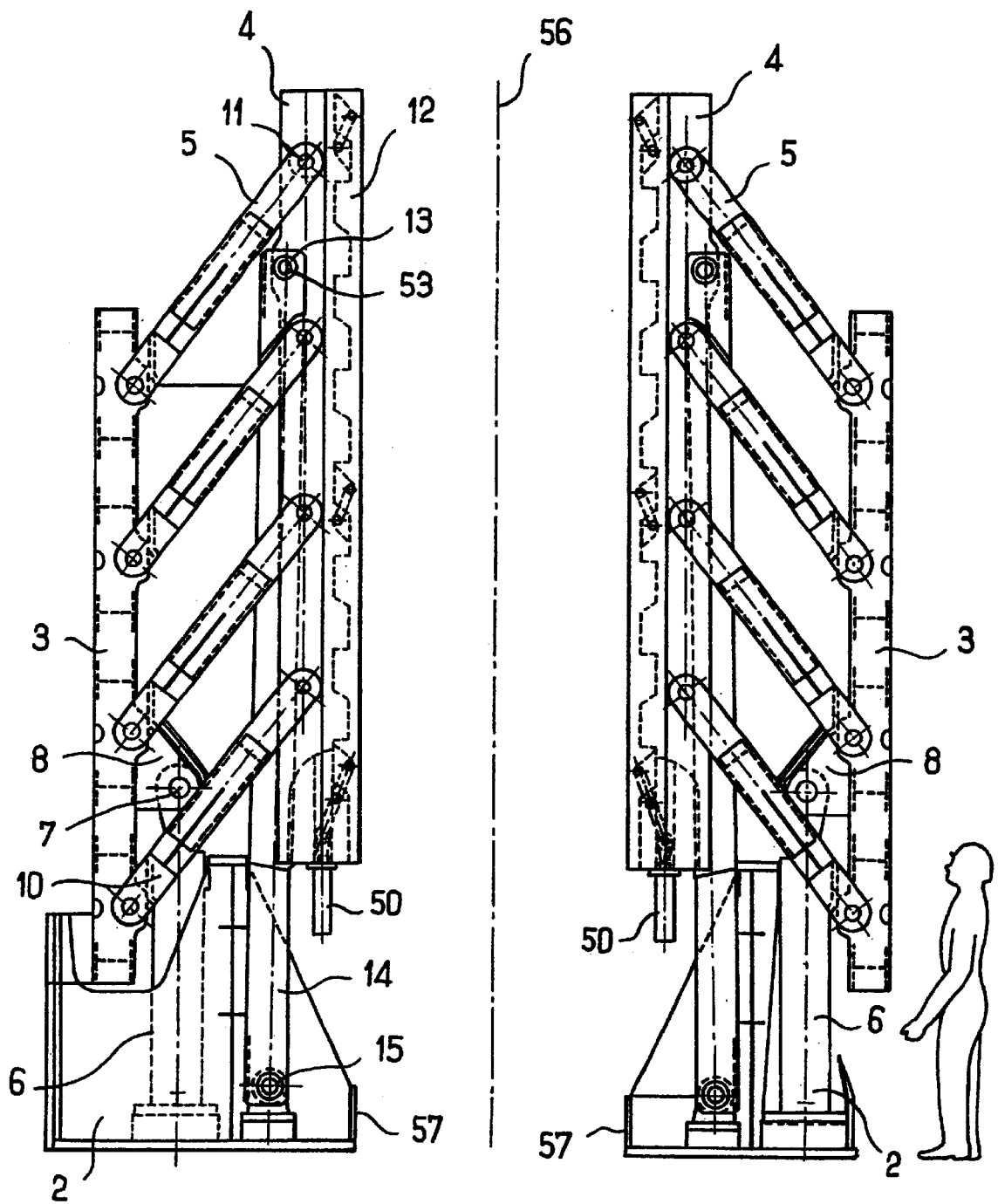
FIG. 3 is a view in section on III—III of the clamp of FIG. 1.

The beam 23 comprises the four aforementioned aligned axle holes 22 and, radially towards the outside and towards the top of the beam 23, a lug 13 houses the axle 53 articulating the top ends of twelve long connecting rods 14 (about 4.8 m long), which are almost vertical, the bottom end of which is articulated at 15 to the base 2 (cf. FIGS. 3 and 4).

By comparing the right-hand and left-hand halves of FIG. 4, it can be seen that deploying the rod of the cylinder actuator 6 raises the clevis joint 8 and the entire body 3 (left-hand half); the jaws 4, held from behind by the articulation 53, are not free to rise up at the same time as the body 3; a relative rotation of the connecting rods 5 about their articulations on the axles 20 thus occurs, the connecting rods 5 adopting a more horizontal position (for example between 7 and 22° to the horizontal in the clamping position). As the body 3 is a fixed distance away from the central axis 56 of the clamp, this results in the jaws 4 moving closer to the central axis 56, corresponding to the clamping of the duct which may have been placed in the clamp 1. During this movement towards the axis, the jaw 4 remains vertical because of the articulated parallelogram system consisting of the connecting rods 5, and its heightwise position has varied only very slightly, because of the slight rotation of the long almost vertical connecting rod 14 providing the connection to the base 2. Considering the base 2 as reference, and assuming that a duct against which the jaws 4 are clamped transmits its weight to these jaws, it can be seen that the resulting forces on the jaws 4 which tend to push these jaws downwards tend at the same time to move them closer to the axis 56 because of the articulation imposed by the connecting rods 14 connected to the fixed base, and therefore tend to clamp the duct more firmly.

In the right-hand half of FIG. 4, total retraction of the cylinder actuator 6 has placed the body 3 in its lowermost position and caused the connecting rods 5 to pivot, relative to the body 3, into their most nearly vertical position (52° to the horizontal), which has had the result of placing the jaw 4 in its position furthest from the central axis 56, that is to say in the position in which the clamp is the widest open. In this position, the separation between the jaws is identical to the diameter of the opening 57 of the base 2.

Figure 2:
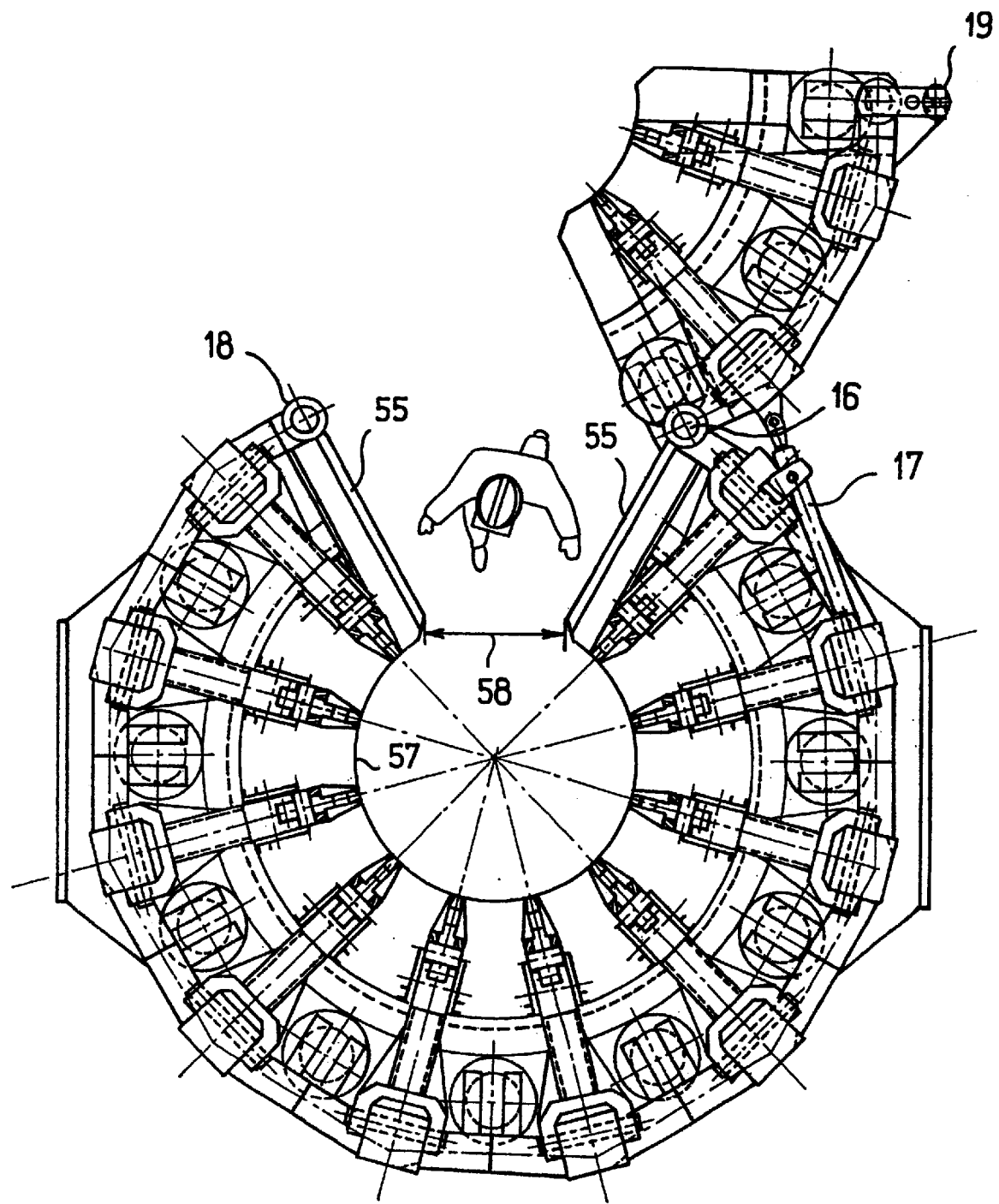
FIG. 2 is a view from above of the same clamp, with the lateral doorway open.

The base 2 and the body 3 can open over a large enough angular sector to allow a duct to be slipped into the clamp, and for example may form a passage 58 measuring about 0.8 m as depicted in FIG. 2. The opening is achieved by pivoting a sector about an articulation 16 using a manoeuvring cylinder actuator 17. Closure and locking are performed at an annular part 18 collaborating with locking actuators 19 (cf. FIGS. 2 and 4). At the edges of the pivoting angular sector, the base 2 has overlapping joints 55.

The clamp 1 according to the invention can be installed as shown in FIG. 16 in a carriage 60 with motorized wheels 61, itself mounted in a duct-laying tower 62 (cf. the aforementioned Patent Application 98/00148). The clamp can also be mounted on any other hand over hand displacement system known per se.

Naturally, a hydraulic control unit, not depicted, is provided for powering the various hydraulic cylinder actuators of the clamp.

The way in which the clamp 1 works for clamping ducts of different diameters will now be explained with more particular reference to FIGS. 8 to 13. To allow the clamp of the invention to adapt to suit the various diameters of pipe, the following features are combined appropriately: firstly, the various dimensions of jaw adapter girders 12, secondly, the deployment or retraction of the said adapter girders into the jaw main beams (if appropriate, independently from one girder to another), and thirdly, naturally, the adjustment of the jaw separation by virtue of the controlled rise or fall of the clamp body 3 and by virtue of the movement of the various connecting rods 5 and 14.

Figure 8B:
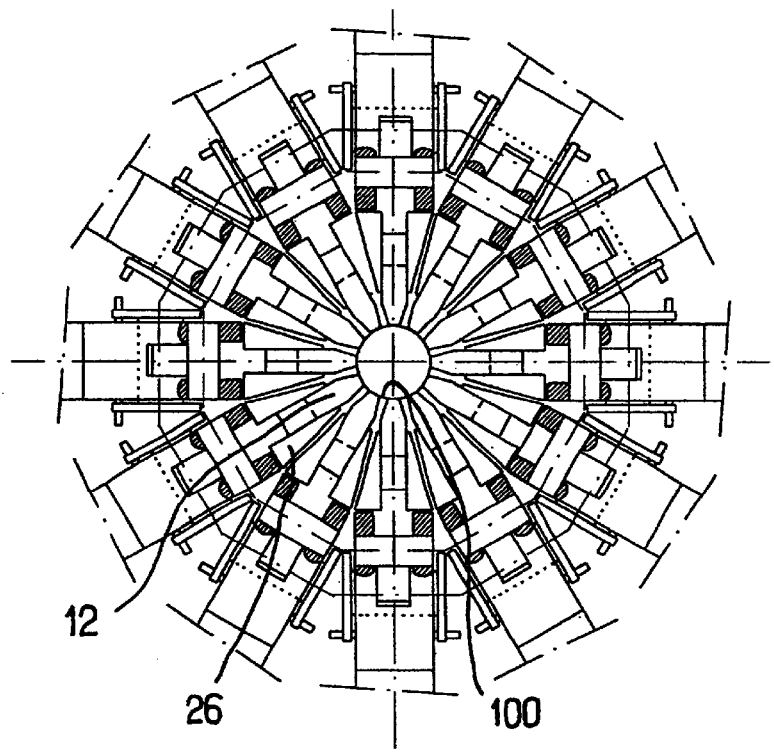

FIGS. 8A, 8B, 9A, 9B, 10A, and 10B show the use of a clamp in which the adapter girders 12 of the jaws 4 are of the smallest size (the one also illustrated in FIGS. 7A, 7C, 7'A, and 7'C), for which the girders 12 lie completely between the flanges 26 of the beams 23 when the jaws are in the retracted position. In FIGS. 8A and 8B, the clamp is clamping a duct 100 of a diameter of 0.22 m. The cylinder actuators 6 are deployed to their maximum extent and the connecting rods 5 are at their minimum angle of inclination α to the horizontal (7°). The cylinder actuators 50 of the jaws are in the deployed position as shown by the inclination of the link rod 24' and the deployed position of the girders 12 with respect to the beams 23 of the jaws. As shown by FIG. 8B, the chamfered flanges 26 of the beams 23, on the one hand, and the chamfered edges of the girders 12, on the other hand, can come very close to one another when clamped around a duct. The separation e between two adjacent flanges is about 13 mm.

Figure 9B:
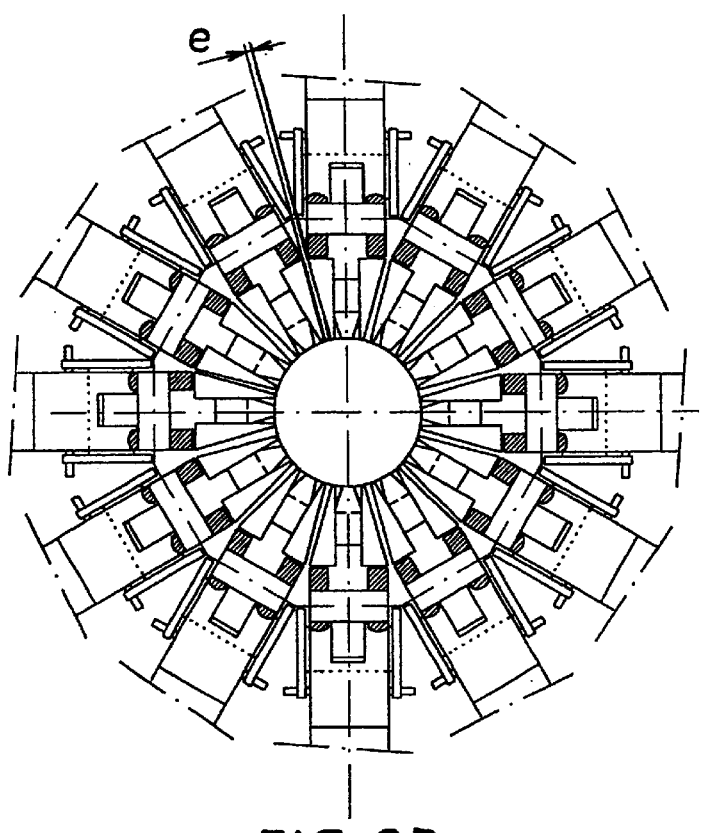

In FIGS. 9A and 9B, the only change is that the cylinder actuators 50 have been retracted and the girders 12 have therefore been retracted into the recess of the beams 23, thus gaining, in terms of diameter, two lots of 90 mm, that is to say allowing the clamping of a duct with a diameter Ø of 0.4 m.

Figure 10B:
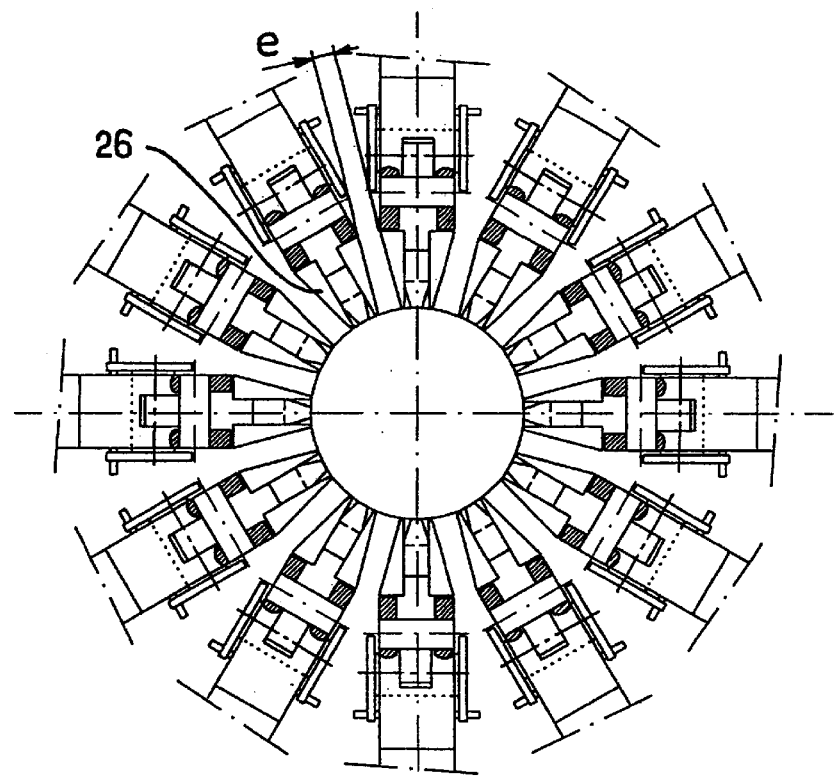

To change to the configuration of FIGS. 10A and 10B, the cylinder actuators 6 have been retracted a little and the body 3 thus lowered, to give the connecting rods 5 a clamping angle α of 22°, and allowing the clamping of a duct 100 with a diameter Ø equal to 0.6 m. The separation e between the adjacent flanges 26 of the jaws is 67 mm.

Figure 11B:
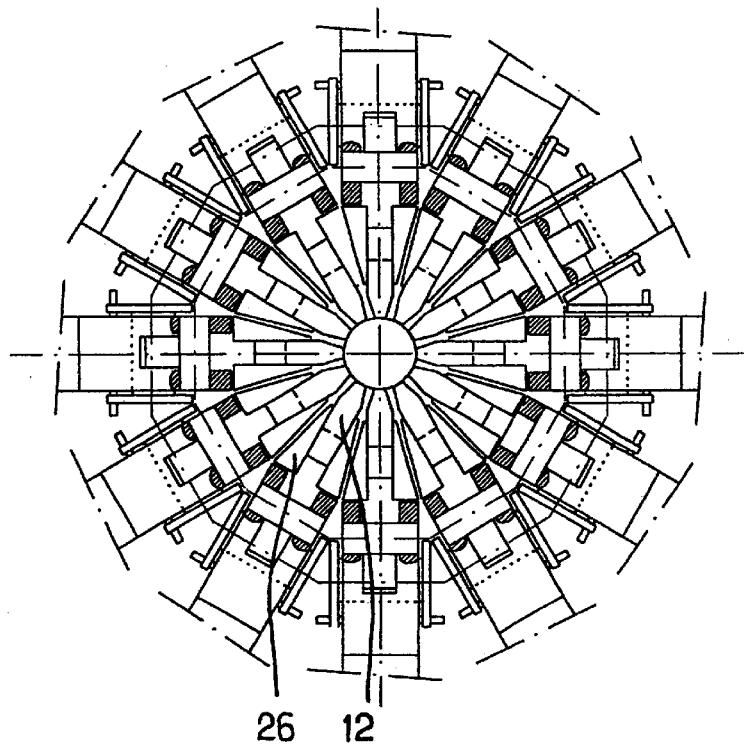
Figure 11A:
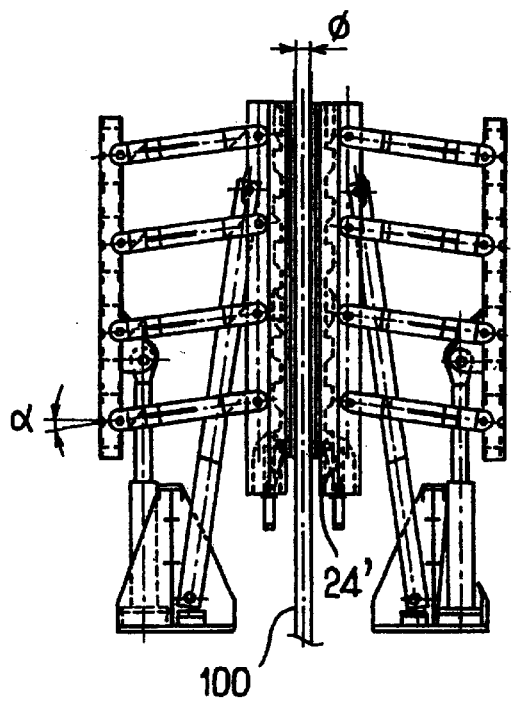
Figure 12A:
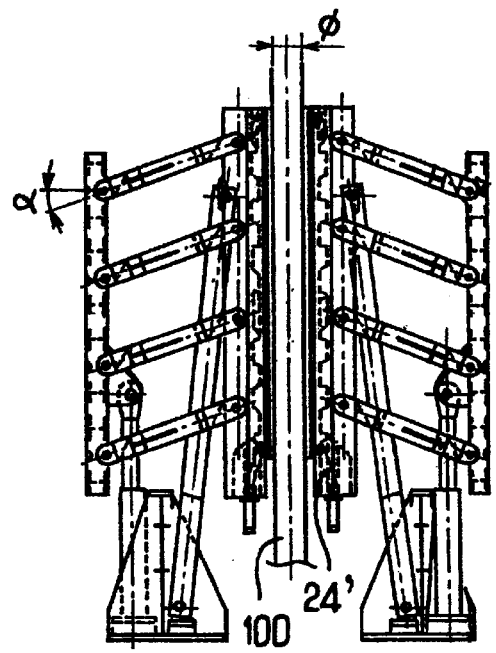
Figure 12B:
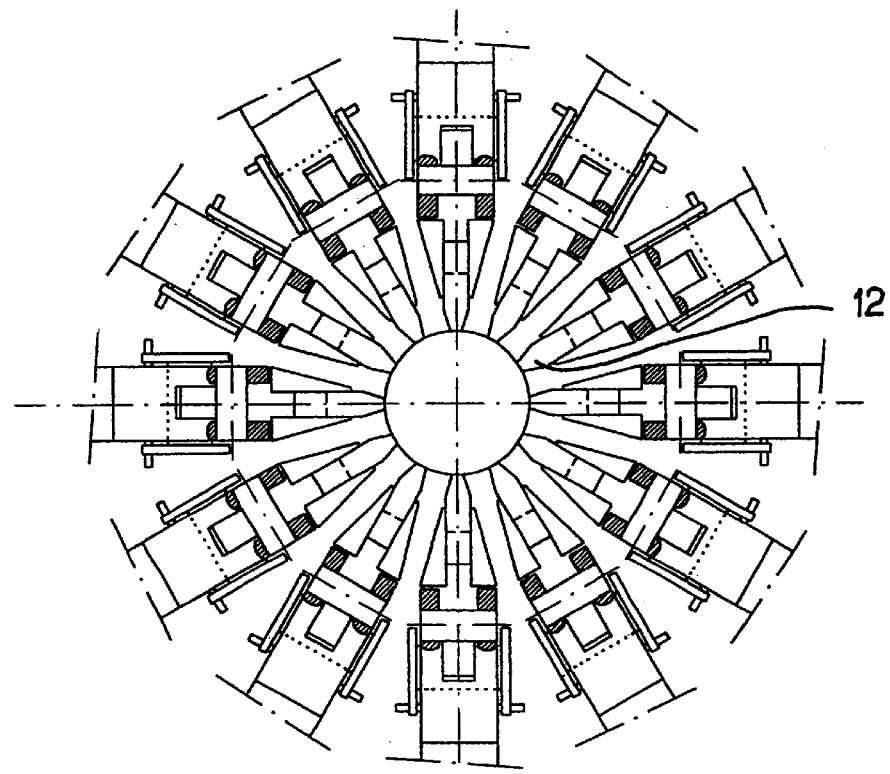

In FIGS. 11A to 12B, use is made of a second size of adapter girders 12 which, even in the non-deployed position as shown by the position of the link rods 24' in FIGS. 11A and 12A, protrude from the flanges 26 of the beams as can be clearly seen in FIGS. 11B and 12B. In the case of FIGS. 11A and 11B, the angle α is 7°, the diameter Ø0.2 m and the separation e 14 mm. In the case of FIGS. 12A and 12B, the angle α is 20°, the diameter Ø0.39 m and the separation e 66 mm. It can thus be seen that in this configuration ducts with the same diameter as the configuration of FIGS. 9A and 9B can be clamped.

Figure 13A:
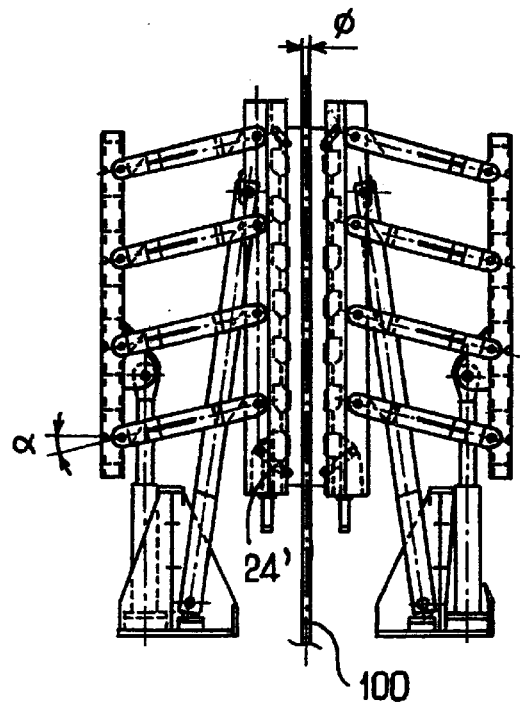
Figure 13B:
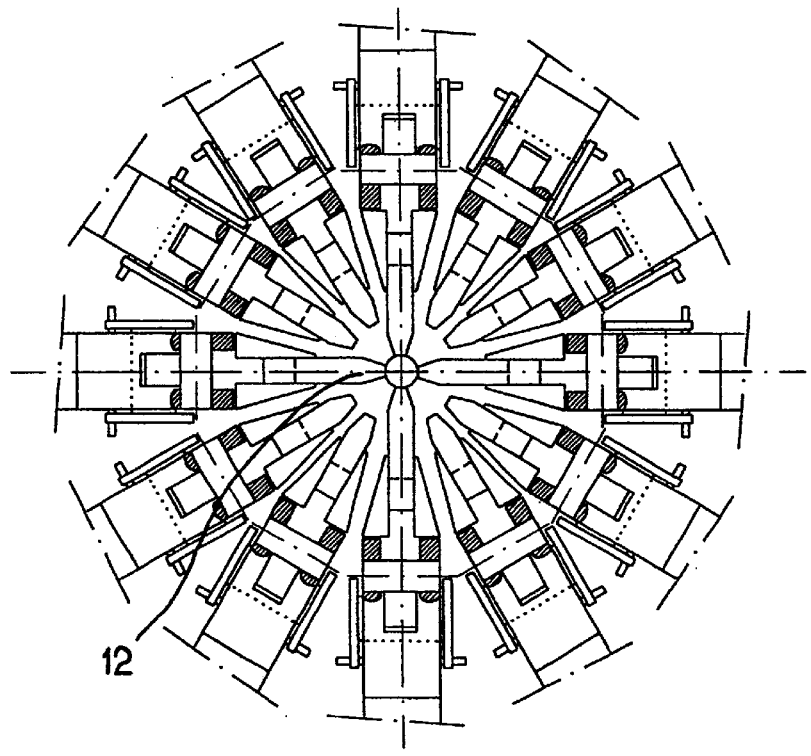
Figure 14:
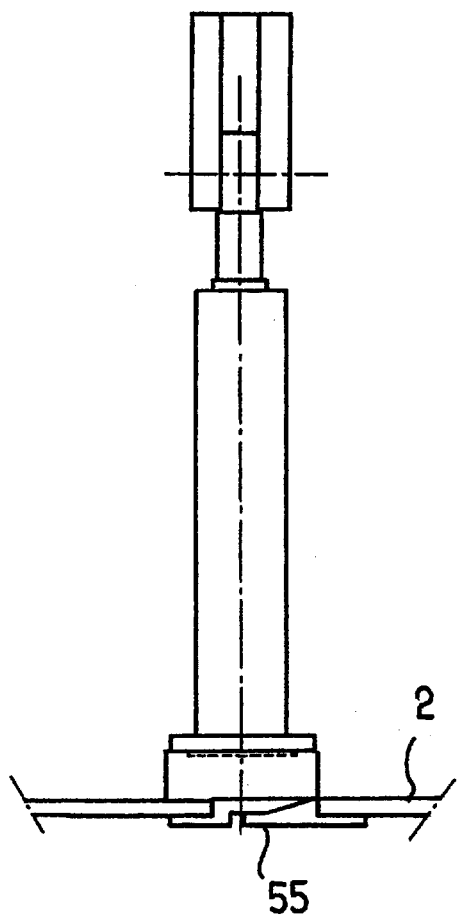
FIG. 14 is a side view of the constructional detail of the base of the clamp, in the region of its opening.

In FIGS. 13A and 13B, use has been made of the same size of girders 12, but with just four of them in the deployed position, these thus being able to clamp a duct of very small diameter (Ø=0.08 m), the eight remaining girders being in the retracted position in order not to impede the extreme moving-together of the four deployed girders.

What is claimed is:

1. Annular clamping ring comprising a rigid annular base (2) which has an axis, and supporting, by support means, a coaxial ring-shaped assembly of jaws (4) parallel to the axis and mobile in diametral planes, the said support means comprising, on the one hand, a rigid annular body (3) surrounding the assembly of jaws (4), mobile in axial translation by means of controllable cylinder actuators (6) which connect it to the base (2), the jaws (4) being connected to the annular body (3) by at least two connecting rods (5) forming an articulated parallelogram, characterized in that the said support means also comprise long connecting rods (14) articulated on the base (2) and on the outside of the jaws (4) in a position which is almost the axial direction, such that the axial translation of the annular body (3) with respect to the base (2) causes a substantially radial and synchronized displacement of the assembly of jaws (4).

2. Clamp according to claim 1, characterized in that each of the jaws (4) consists of a main beam (23) and of an adapter girder (12) mounted on the main beam (23) at a distance away that can be altered between at least two positions.

3. Clamp according to claim 2, characterized in that the adapter girders (12) are chosen from sets of several sizes.

4. Clamp according to claim 3, characterized in that provision is made in the base and the body of the clamp for a sector to be opened to slip a duct in sideways or for inspection.

5. Clamp according to claim 2, characterized in that provision is made in the base and the body of the clamp for a sector to be opened to slip a duct in sideways or for inspection.

6. Clamp according to claim 1, characterized in that provision is made in the base (2) and the body (3) of the clamp for a sector to be opened to slip a duct in sideways or for inspection.

* * * * *